(12) United States Patent
Kumar et al.

(10) Patent No.: US 8,959,000 B2
(45) Date of Patent: Feb. 17, 2015

(54) INTEGRATED TESTING SYSTEMS AND METHODS

(75) Inventors: Balaji Kumar, Irving, TX (US); Anne L. Miller, Salem, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1260 days.

(21) Appl. No.: 12/211,756

(22) Filed: Sep. 16, 2008

(65) Prior Publication Data
US 2010/0070230 A1    Mar. 18, 2010

(51) Int. Cl.
  *G01R 31/28* (2006.01)
  *G06F 11/36* (2006.01)
  *G06F 11/263* (2006.01)

(52) U.S. Cl.
  CPC .......... *G06F 11/3672* (2013.01); *G06F 11/263* (2013.01)
  USPC ........................................................ 702/119

(58) Field of Classification Search
  USPC ........................................................ 702/119
  See application file for complete search history.

(56) References Cited

PUBLICATIONS

David Lugato, Automated Functional Test Case Synthesis from THALES industrial Requirements, Proceedings of the 10th IEEE Real-Time and Embedded Technology and Applications Symposium (RTAS'04) 1080-1812/04 $ 20.00 © 2004 IEEE, p. 1-8.*
Alessandra Cavarra, Jim Davies, Using UML for Automatic Test Generation, ISSTA 2002 Rome, Italy, p. 1-11.*
http://www.webopedia.com/TERM/C/compiler.html, 2 pages, Compiler, printed Mar. 12, 2014.*
Ex parte Thomas E. Valiulis and Robert Louis Northrup Jr., Decided: May 16, 2007, pp. 7.*
Correia, Edward J., "Automatically Automate your Automation", SD Times on the Web, Apr. 29, 2008.
Rybalov, M., "Design Patterns for Customer Testing", www.autotestguy.com/archives/2005/01/design_patterns.html.
Chow, et al., "Building a Flexible & Extensible Framework Around Selenium," Google Test Automation Conference (GTAC), 33 pages, Sep. 20, 2007.
Correia, "Automatically Automate Your Automation," SD Times on the Web, http://www.sdtimes.com/content/article.aspx?ArticleID=32098, six pages, Apr. 29, 2008.
Rybalov, "Design Patterns for Customer Testing," http://www.autotestguy.com/archives/Design%20Patterns%20for%20Customer%20Testing.pdf, 21 pages, Copyright 2004.

\* cited by examiner

*Primary Examiner* — Tung S Lau

(57) ABSTRACT

An exemplary method includes parsing data representative of an automated test case into at least one transaction defined in accordance with a global test language, translating the transaction into at least one command specific to an automated test tool, and providing the command to the automated test tool for execution. In certain examples, the method further includes parsing the data representative of the automated test case into at least one other transaction defined in accordance with the global test language, translating the other transaction into at least one other command specific to another automated test tool, and providing other command to the other automated test tool for execution.

30 Claims, 6 Drawing Sheets

INTEGRATED TESTING SYSTEMS AND METHODS

BACKGROUND INFORMATION

A variety of tools have been developed for automated testing of software applications, hardware devices, and related services. Unfortunately, such conventional automated test tools suffer from several shortcomings. For example, automated test tools are often vendor specific, proprietary in nature, and/or designed to work as standalone tools. For at least these reasons, it can be difficult and time consuming to combine, upgrade, and/or substitute such automated test tools. For instance, when a test tool provided by one vendor is replaced or augmented with another test tool provided by another vendor, significant time and resources must typically be consumed in order to update and/or create new test cases configured to run on the other test tool.

As another example, automated test tools are typically designed to test a specific software application and/or hardware device. This can be problematic when there is a need to test a combination of multiple different applications or devices. Although certain test tools may be combined ad hoc into a new testing framework, such a framework is typically unique to a specific test case and/or to a particular combination of applications and/or devices. If a change is made, e.g., a new test tool is introduced, or there is a need to test another unique combination of applications and/or devices, a new framework and test case typically must be developed, or the existing framework and test case updated in order to test the other unique combination of applications and/or devices. Such ad hoc creation or refactoring of an automated testing framework and test case is typically time consuming and labor intensive. The above problems are generally exacerbated for a large organization having multiple groups testing different cross-sections of a variety of applications, devices, and/or related services.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical reference numbers designate identical or similar elements.

DETAILED DESCRIPTION OF PREFERRED EMBODIMENTS

Exemplary integrated testing systems and methods are disclosed herein. An exemplary integrated testing subsystem may provide a framework configured to support a variety of combinations of test tools and/or integrated test cases configured to test various assets such as software applications, hardware devices, and/or related services. Various integrated test cases configured to use various combinations of test tools to test one or more assets may be created independently of a particular test tool or test tool language. Accordingly, a test case may continue to be used, without having to be updated, even after a change to a test tool is made or a new test tool is introduced. Moreover, the framework may support convenient testing of combinations of assets that include cross-sections of different computing platforms, networks, and devices.

Components and operations of exemplary integrated testing systems and methods will now be described with reference to the drawings.

Figure 1:
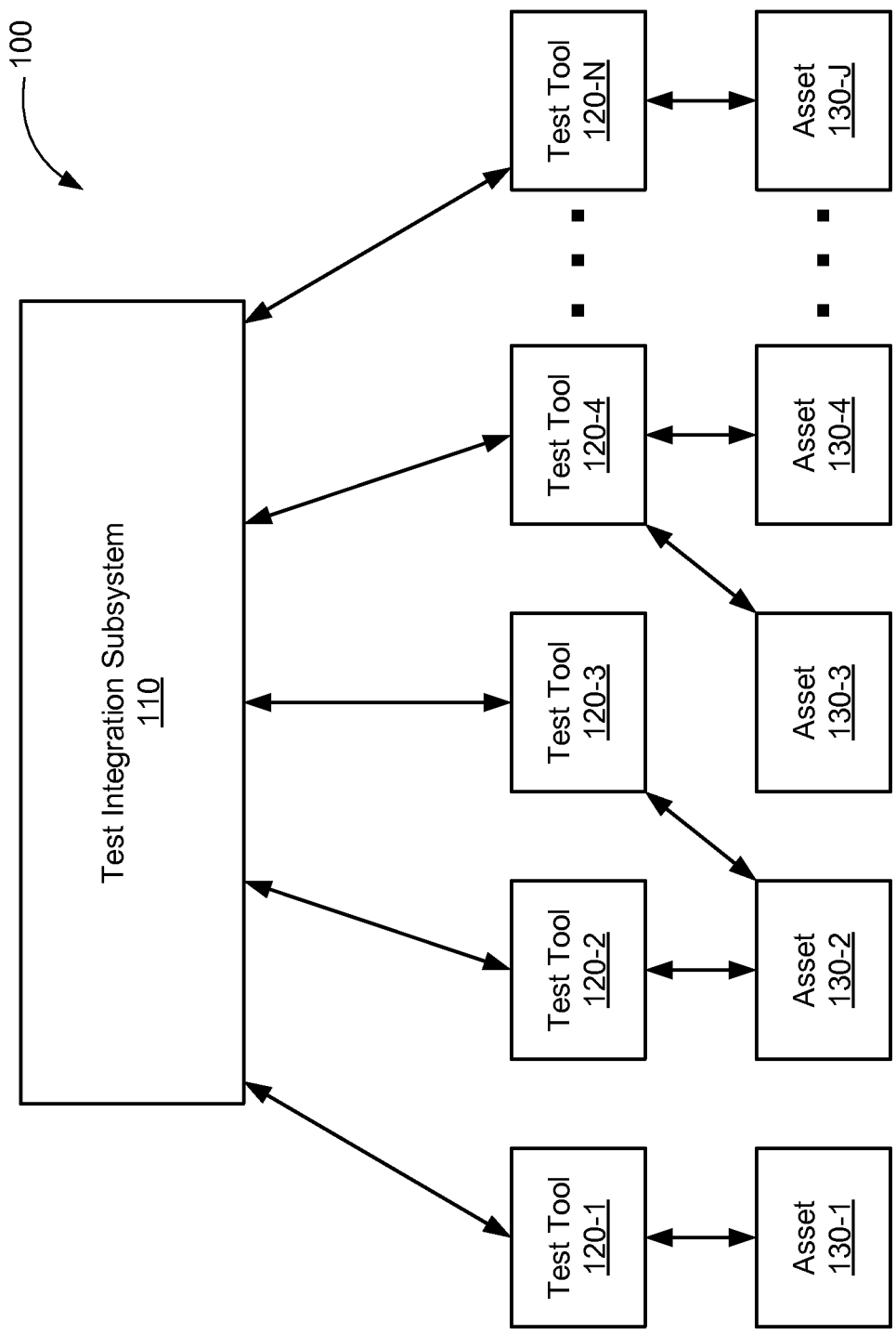
FIG. 1 illustrates an exemplary integrated testing system.

FIG. 1 illustrates an exemplary integrated testing system 100 (or simply "system 100"). As shown in FIG. 1, system 100 may include a test integration subsystem 110, a plurality of test tools 120-1 through 120-N (collectively "test tools 120"), and a plurality of assets 130-1 through 130-J (collectively "assets 130") selectively and communicatively connected to one another as shown. Components of system 100 may be configured to communicate with one another using any communication platforms, networks, and technologies suitable for transporting data, test commands, test results, and/or other communications, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Time Division Multiplexing ("TDM") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, Fiber-to-the-premises ("FTTP") technologies, Passive Optical Network ("PON") technologies, and other suitable communications technologies.

In certain implementations, system 100 may include or be implemented in one or more computing devices. System 100 may include any computer hardware and/or instructions (e.g., software programs), or combinations of software and hardware, configured to perform one or more of the processes described herein. In particular, it should be understood that elements of system 100 may be implemented on one or more physical computing devices. Accordingly, system 100 may include any one of a number of computing devices (e.g., one or more server devices), and may employ any of a number of computer operating systems, including, but by no means limited to, known versions and/or varieties of the Microsoft Windows, Unix, and Linux operating systems.

Accordingly, one or more of the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) may include any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media may include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Each of the test tools 120 may be configured to perform one or more operations to test at least one of the assets 130. An asset 130 may include a device, an application configured to run on a device, a service provided by or otherwise associated with a device and/or application, or a combination or sub-combination thereof that may be tested by one or more of the test tools 120. For example, an asset 130 may include a device (e.g., a server device or an end-user device) included in a communications network, an application running on the device, and/or a communications service provided at least in part by the device and/or application. Examples of assets 130 may include, but are not limited to, web based, telephony based (e.g., wireless phone based and/or landline based), and/or television based applications, devices, and/or services.

Certain test tools 120 may be configured to test certain assets 130 or types of assets 130. For example, a particular test tool 120 may be configured to test telephony based assets 130, and another test tool 120 may be configured to test web based assets 130. In the example shown in FIG. 1, test tool 120-1 is configured to test asset 130-1, test tools 120-2 and 120-3 are configured to test asset 130-2, test tool 120-4 is configured to test assets 130-3 and 130-4, and test tool 120-N is configured to test asset 130-J. The associations shown in FIG. 1 between test tools 120 and assets 130 are illustrative only. Other implementations may include other associations.

A test tool 120 may receive one or more commands from test integration subsystem 110 and execute the command(s) to cause one or more test operations to be performed. As an example, test tool 120-1 may test an asset 130 such as a telephony device, application, and/or service by executing one or more commands received from test integration subsystem 110 to cause one or more test operations to be performed on or by the asset 130. The test operations may include instructing the asset 130 to perform one or more actions and to provide feedback indicative of the results of the actions. For instance, test tool 120-1 may direct that an external phone call be placed to a telephony device and that a call log associated with the telephony device be checked to verify that the phone call was received and/or logged.

Commands executable by a particular test tool 120 may be specific to the test tool 120. For example, the commands may be defined in accordance with a local test language that is understandable to the test tool 120. In certain examples, each of the test tools 120 may use a different local test language to interpret and execute test commands. Accordingly, test commands configured to be executed by a particular test tool 120-1 may not be executable by another test tool 120-2 configured to use other test commands.

Each of the test tools 120 may include or be implemented as computing hardware, computer readable instructions (e.g., software), or a combination thereof. A test tool 120 may comprise in-house, vendor-provided, or other hardware and/or software configured to test one or more assets 130. Examples of test tools 120 may include, but are not limited to, Quick Test Professional (QTP), Watir, Selenium, Abacus (e.g., Abacus A-100), Asterisk, TQPro, Labtown, and Test Quest Countdown test tools and/or any other tools configured to test one or more assets 130.

Test integration subsystem 110 may be configured to provide one or more commands that are specific and understandable to one or more of the test tools 120, including providing commands to various heterogeneous combinations of the test tools 120. The commands may be defined in accordance with the local test languages specific to the respective test tools 120. To this end, test integration subsystem 110 may employ a global test language and may be configured to translate between the global test language and any of the local test languages specific to the test tools 120. Accordingly, automated test cases for testing various assets 130 and/or combinations of assets 130 may be developed in accordance with a global test language, and test integration subsystem 110 may translate the test cases from the global test language into one or more test commands specific to any of the test tools 120.

Figure 2:
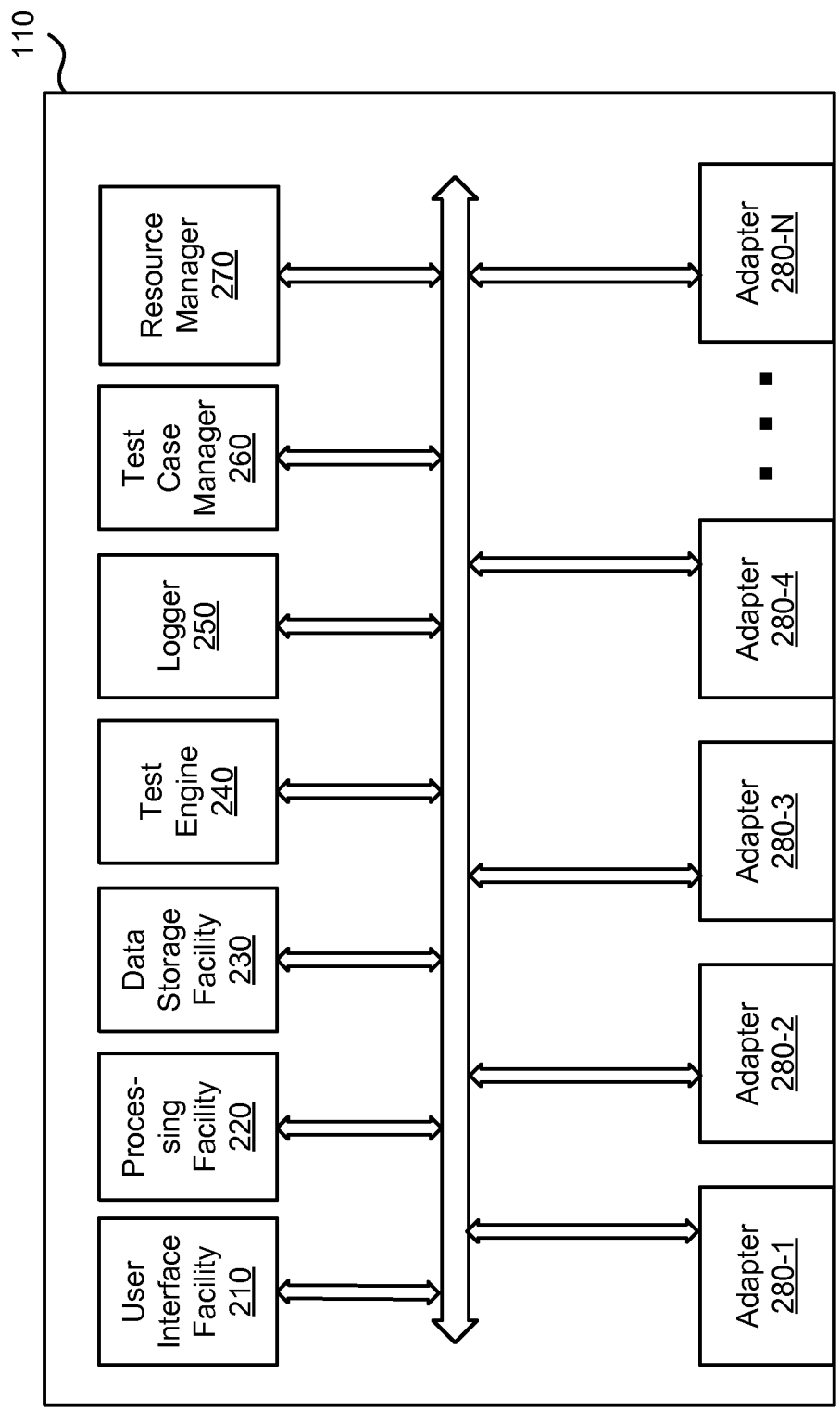
FIG. 2 illustrates an exemplary test integration subsystem.

FIG. 2 illustrates an exemplary test integration subsystem 110. While FIG. 2 illustrates exemplary elements of test integration subsystem 110, the example is illustrative only. Other implementations may include alternative configurations of elements configured to perform one or more of the processes described herein. In certain examples, elements of test integration subsystem 110 may be implemented in a single computing device (e.g., a personal computer) for local user access. In other examples, elements of test integration subsystem 110 may be implemented on at least one server or other device for remote user access. In certain implementations, test integration subsystem 110, or one or more elements of test integration subsystem 110, may be implemented with a web application framework such as Ruby on Rails.

As shown in FIG. 2, test integration subsystem 110 may include a user interface facility 210, processing facility 220, data storage facility 230, test engine 240, logger 250, test case manager 260, resource manager 270, and a plurality of adapters 280-1 through 280-N (collectively "adapters 280"). The elements of test integration subsystem 110 may include or be implemented as computing hardware, computer readable instructions (e.g., software), or a combination thereof. The elements of test integration subsystem 110 may be configured to communicate with one another in any suitable way and using any suitable communication technologies.

User interface facility 210 may be configured to provide at least one interface through which a user may interact with test integration subsystem 110. Any suitable user interface may be employed, including a web based interface such as a web browser.

Through a user interface, a user may configure, initialize, and/or launch one or more of the elements of test integration subsystem 110. This may include defining and/or modifying a global test language or elements of the global test language, configuring settings for elements of test integration subsystem 110, and creating, adding, deleting, and/or modifying one or more adapters 280. A global test language will be described in more detail further below.

Through a user interface, a user may create, configure, import, modify, delete, run, terminate, or otherwise manage one or more automated test cases. An automated test case may include a set of computer readable instructions that when executed may cause one or more test operations to be performed. In certain examples, an automated test case may include and/or be created using one or more Ruby on Rails scripts.

In certain examples, a test case may be stored as one or more computer readable files. Table 1 below contains exemplary computer readable instructions defining an exemplary automated test case definition file. As described further below, a test case, including the exemplary test case shown in Table 1, may be defined in accordance with a global test language. The exemplary test case shown in Table 1 is configured to initiate placement of a phone call to a particular telephone number, a log-in to a web based application, and verification that a list of incoming calls in the web based application includes a most recent entry for the phone call. In other words, the test case is configured to test a web based call log application. The test case shown in Table 1 will be referred to in the following description to help illustrate exemplary operations that may be performed by the elements of test integration subsystem 110 in relation to execution of a test case.

TABLE 1

Exemplary Test Case Definition File

```
class CallLogsTestcase < Photon::Testcase
  def initializeTestcase
    Photon::StringLog.new(Logger::DEBUG,
      "CallLogsTestcase::initializeTestcase: #{@testcaseID}").log
    Photon::StringLog.new(Logger::DEBUG,
      "CallLogsTestcase::initializeTestcase: " +
      "#{@resources[0].inspect}").log
    @account = @resources[0]
    @webBrowser = @resources[1]
    @telephone = @resources[2]
  end
  def runTestcase
    Photon::StringLog.new(Logger::DEBUG,
      "WebBrowserPOCTestcase::runTestcase: #{@testcaseID}").log
    @telephone.dialExternal(9078325154)
    path = "http://www35.verizon.com/FiOSVoice/signin.aspx"
    @webBrowser.gotoURL(path)
    @webBrowser.text_field(:name => "UserId").setValue(
      account.resourceMap.attributes[:username])
    @webBrowser.text_field(:name => "Password").setValue(
      account.resourceMap.attributes[:sso_disabled_password])
    @webBrowser.div(:class => "SPBtn2").click(0)
    sleep 8.0
    dialog1 = @webBrowser.dialog(
      :title => "Microsoft Internet Explorer").exists?
    if dialog1 then
      @webBrowser.dialog(:title => "Microsoft Internet
        Explorer").button(:value => 'OK').click
    end
    sleep 8.0
    @webBrowser.link(:id => "CALLSANDMESSAGESLnk").click
    sleep 5.0
    @result = @webBrowser.table(:column_header =>
      "Status").getCellValue(5,3)
  end
  def reportTestcaseResults
    Photon::StringLog.new(Logger::DEBUG,
      "WebBrowserPOCTestcase::reportTestcaseResults:
      #{@testcaseID}").log
    call_fromExpected = @telephone.resourceMap.attributes[:ptn]
    if @result == call_fromExpected then
      Photon::TestcaseResultLog.new(@testcaseID, @runningTime,
        :pass, "#{@testcaseName}::pass").log
    else
      Photon::TestcaseResultLog.new(@testcaseID, @runningTime,
```

TABLE 1-continued

Exemplary Test Case Definition File

```
        :fail, "#{@testcaseName}:: Call from: |#{@result}| does not
        match " + "expected: |#{call_fromExpected}|").log
    end
  end
  def CallLogsTestcase.getRequiredResourceMaps
    rmaps = [Photon::ResourceMap.new({:type => :account}),
      Photon::ResourceMap.new({:type => :web_browser}),
      Photon::ResourceMap.new({:type => :telephone})]
    puts rmaps
    return rmaps
  end
end
```

Management of test cases may include a user organizing one or more test cases into a test run and submitting the test run for execution by the test integration subsystem 110. In this manner, a user may conveniently combine one or more test cases into a test run as may suit a particular implementation or test scenario without necessarily limiting the test cases to a particular test tool, test tool specific language, or other test tool specific attribute. As described below, test integration subsystem 110 may execute a test case included in a test run. As is also described below, feedback associated with execution of a test case may be collected and reported to a user by way of a user interface generated by user interface facility 210. Accordingly, a user may utilize a user interface to access test results.

Processing facility 220 may be configured to control and/or carry out operations of one or more elements of test integration subsystem 110. Processing facility 220 may execute and/or direct execution of operations in accordance with computer-executable instructions such as may be stored in data storage facility 230 or other computer-readable medium.

Data storage facility 230 may include one or more data storage media, devices, or configurations and may employ any type, form, and combination of computer-readable media. For example, the data storage facility 230 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including data representative of automated test cases, test runs, resource configurations, and logged test results, may be temporarily and/or permanently stored in the data storage facility 230. Data may be stored in data storage facility 230 using one or more suitable data entities and/or structures, including one or more relational or hierarchical databases, for example. In certain examples, data storage facility 230 includes a database implementation with one or more ports to one or more web application packages (e.g., Ruby on Rails packages such as ActiveRecord or DBI).

As mentioned above, test integration subsystem 110 may be configured to provide a global test language, and an automated test case may be defined in accordance with the global test language. The global test language may be defined to specify parameters, syntax, and/or structure of an automated test case. The test case shown in Table 1 includes a class definition configured to inherit from a super class (e.g., a "Photon::Testcase" super class). The class definition defines processes for initializing a test case, running the test case, reporting the test case results, and obtaining resources to be used by the test case. The test case class definition may be structured such that the process for obtaining resources to be used by the test case is defined separately in order to allow various combinations of resources to be specified in different test cases.

The global test language may be defined to also specify one or more transactions that may be included in a test case and used to carry out one or more test procedures. The transactions may include base level operations that may be performed to carry out one or more test procedures. The test case shown in Table 1 is defined in accordance with an exemplary global test language and includes certain exemplary transactions defined by the global test language. For example, the test case in Table 1 includes transactions for dialing an external phone number (e.g., "dialExternal(phone number)"), accessing a web address (e.g., "gotoURL(path)"), setting text fields to values (e.g., "setValue"), clicking a web hyperlink (e.g., "click"), and getting a cell value (e.g., "get CellValue"). These transactions are illustrative only. A variety of transactions may be defined by a global test language and used to carry out test procedures as may suit a particular implementation.

In certain examples, the global test language may be defined to include multiple different sets of one or more transactions. Each set of transactions may be associated with a particular resource or resource type. As used herein, a "resource" may refer to any asset 130, test tool 120, and/or component thereof that may be used to perform test operations specified by a test case. For example, a resource may include an asset 130 such as a telephony device, web browser, set-top box, or test tool object or instance that may be used to perform a test operation.

A "resource type" may refer to a grouping of one or more resources by type. Hence, resources associated with a particular type of platform, network, domain, device, application, or service may be classified as belonging to a particular resource type. For example, resources associated with a wireless phone platform, network, domain, or service may be classified as a wireless phone resource type (e.g., a cellular phone resource type), resources associated with a user interface may be classified as a user interface resource type (e.g., a web browser resource type), resources associated with a telephony platform, network, or domain (e.g., a PSTN or VoIP platform or network) may be classified as a telephony resource type, resources associated with a television platform, network, domain, or service (e.g., a Verizon FiOS® television service) may be classified as a television resource type, and resources associated with a data storage platform, network, domain, or service may be classified as a data storage resource type. These particular resources types are illustrative only. Other resource types may be defined as may suit a particular implementation.

Figure 3:
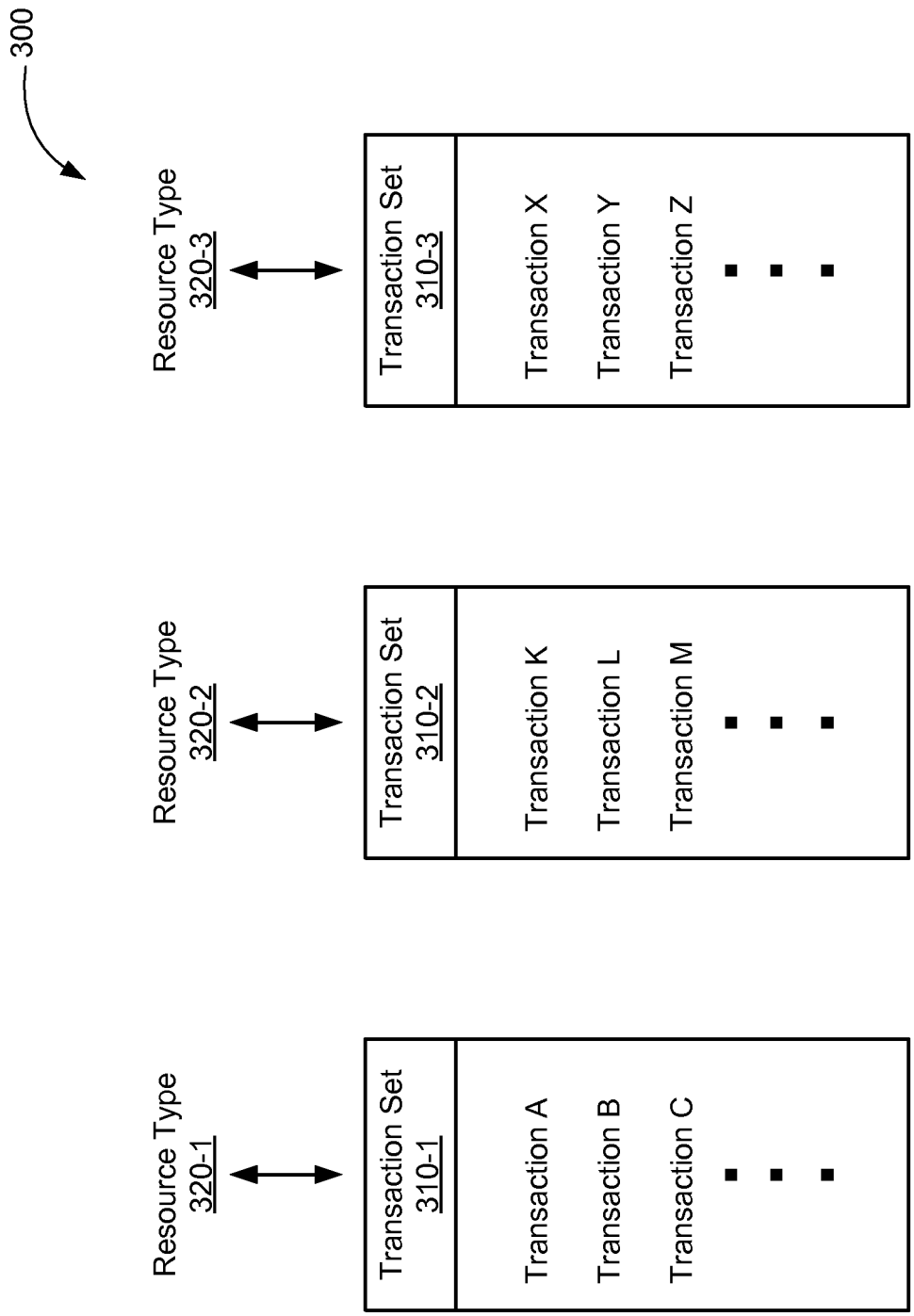
FIG. 3 illustrates an exemplary configuration of transaction sets and resource types.

In certain examples, each resource type may be associated with a particular set of transactions defined by the global test language. For example, FIG. 3 illustrates an exemplary configuration 300 of transaction sets 310-1 through 310-3 associated with resource types 320-1 through 320-3, respectively. In certain examples, resource type 320-1 may include a web browser resource type associated with a defined set of transactions 310-1 including transactions for clicking on a web hyperlink, getting a value based on an attribute or a description, getting a cell value, setting a value, determining whether an object or instance exists (e.g., determining whether a particular web browser instance exists), going to a web address (e.g., go to a URL), going back a web page, going forward to a web page, refreshing a web page, maximizing a browser window, minimizing a browser window, and getting a count of an object or object type. Resource type 320-2 may include a telephony resource type associated with another defined set of transactions 310-2 including transactions for dialing an external phone number, dialing an internal telephone number, simulating a ring signal, blocking a phone call, forwarding a phone call, leaving a voicemail message, and dialing a code. Resource type 320-3 may include a television resource type associated with another defined set of transactions 310-3 including transactions for clicking a link within a user interface, selecting a path, getting a value, setting a value, getting text, verifying text, verifying an image, setting values, getting a count, getting a "next" value, getting a "previous" value, closing a user interface, determining whether an object or instance exists, and actuating a key. These transactions sets 310 and corresponding resource types 320 are illustrative only. Other transactions, transaction sets 310, and/or resource types 320 may be used in other implementations. In certain implementations, for example, user interface facility 210 may facilitate a user adding, modifying, deleting, or otherwise managing a set of transactions 310 and/or a resource type 320. For instance, a user may define a new set of transactions 310 for testing a new asset 130 belonging to a new resource type 320.

Resource types 320 used in a test case may be specified within the test case in accordance with the global test language. The test case shown in Table 1 specifies three resource types 320—an account resource type, a web browser resource type, and a telephone resource type. An account resource type may indicate that an account resource is used in the test case. An account resource may include data associated with a user account (e.g., a subscriber account) from which attributes or information may be obtained for use in a test case. A telephone resource type may indicate that a telephony device will be used in the test case. A web browser resource type may indicate that a web browser is used in the test case. In the test case in Table 1, the account resource is used to obtain user login information (e.g., a user name and password) for use in logging into a web based application, a telephony device is used to place an external phone call to a specified phone number, and a web browser is used to access a web address, log in, click on one or more hyperlinks, and obtain a cell value.

Returning to FIG. 2, test engine 240 may be configured to parse data representative of an automated test case into at least one transaction in accordance with the global test language. For example, test engine 240 may parse the test case in Table 1 into transactions for dialing an external phone number, going to a URL, getting account login information, clicking one or more hyperlinks, and getting a particular cell value. Other test cases may be similarly parsed into one or more transactions specified in the test cases and in accordance with the global test language.

The test engine 240 may be configured to provide the transactions parsed from the test case to one or more adapters 280. Each of the adapters 280 may be associated with a particular resource type 320 and with at least one test tool 120. In particular, each of the adapters 280 may be configured to translate one or more transactions included in a transaction set 310 defined by the global test language into one or more commands specific to at least one automated test tool 120. For example, a particular adapter 280-1 may be configured to translate transactions included in a transaction set 310-1 corresponding to resource type 320-1 into one or more commands specific to test tool 120-1.

Test engine 240 may be configured to selectively provide a transaction to an adaptor 280 for translation of the transaction. In certain examples, the adapter 280 may be selected based at least in part on a resource type 320 associated with the transaction. For instance, a resource type 320 specified in a test case may be identified and a transaction also specified in the test case and associated with the resource type 320 may be selectively provided to an adapter 280 associated with the resource type 320. Other factors may similarly be used to selectively provide a transaction to an adapter 280.

Translation by an adapter 280 may be accomplished in any suitable manner, and the resulting commands may be in any suitable form executable by a test tool 120. As an example, adapter 280-1 may be configured to translate transactions included in a transaction set 310-1 corresponding to a web browser resource type 320-1 into one or more commands specific to a test tool 120-1, which for purposes of this example may comprise a Watir web browser test tool 120-1. The particular test tool 120-1 may be configured to provide one or more instances of a web browser, assign a unique identifier to each web browser instance, and provide the unique identifier(s) to adapter 280-1. To execute a particular transaction, adapter 280-1 may use a unique identifier associated with a web browser instance with which the transaction is to be executed to access the web browser instance. Adapter 280-1 may identify and call a test tool specific command associated with the transaction. For example, the transaction may include a "gotoURL" transaction, and adapter 280-1 may be configured to identify and call a "gotoURL" command specific to the Watir web browser test tool 120-1. Adapter 280-1 may provide the test tool specific command to the test tool 120-1 for execution. The test tool 120-1 may then execute the test tool specific command.

As another example, adapter 280-2 may be configured to translate transactions included in a transaction set 310-1 corresponding to a web browser resource type 320-1 into one or more commands specific to another test tool 120-2, which for purposes of this example may comprise a QTP web browser test tool 120-2. The particular test tool 120-2 may be configured to provide one or more instances of a web browser and to provide a window handle for each instance to adapter 280-2. To execute a particular transaction, adapter 280-2 may be configured to provide a window handle and other information about the transaction to be executed (e.g., parameters such as a destination URL) to the QTP test tool 120-2 in an initialization file (e.g., an "environment.ini" file). Adapter 280-2 may then use a script language (e.g., VBScript) to invoke a QTP test case command that when executed by test tool 120-2 will read the initialization file, execute the transaction, and write the results back to the initialization file. Adapter 280-2 may be configured to read the results from the initialization file and exit the transaction.

As yet another example, adapter 280-3 may be configured to translate transactions included in a transaction set 310-2 corresponding to a telephone resource type 320-2 into one or more commands specific to a test tool 120-3, which for purposes of this example may comprise an Abacus telephony test tool 120-3. To execute the transaction, adapter 280-3 may generate one or more commands in a script (e.g., a TCL script), which may be provided to test tool 120-3 for execution. For example, where the transaction comprises a dial external phone number transaction, adapter 280-3 may provide a test tool specific script command to test tool 120-3 for execution. Adapter 280-3 may be configured to download a result file (e.g., an XML result file) from test tool 120-3. Once execution of the script is complete, adapter 280-3 may read the results file and exit the transaction.

The above examples are merely illustrative of certain adapters 280 configured to provide interfaces between certain test tools 120 and certain transactions defined in accordance with a global test language. Other adapters 280 may be used as may suit other implementations. Accordingly, transactions and/or transaction sets 310 defined in accordance with a global test language may provide integrated interfaces for which adapters 280 may be created to interface various test tools 120 with test integration subsystem 110. For a new test tool 120, for example, a new adapter 280 may be created and deployed to interface the new test tool 120 with a set of transactions 310 defined by the global test language. With the new adapter 280 in place, existing test cases defined in accordance with the global test language may be executed by the new test tool 120, without having to rework the test cases specifically for the new test tool 120. Accordingly, test cases defined in accordance with the global test language are independent of test tool specific languages and transactions included in the test cases may be conveniently translated by appropriate adapters 280 for execution by a variety of test tools 120 and/or combinations of test tools 120.

Test tools 120 may be configured to generate and provide feedback associated with execution of commands provided to the test tools 120 by adapters 280. Adapters 280 may be configured to obtain such feedback from the test tools 120.

In addition, adapters 280 may be configured to utilize the feedback to determine success or failure of a transaction associated with the commands executed by the test tools 120. In certain examples, a transaction defined in accordance with the global test language may be defined to return a success or failure notice upon completed execution of the transaction. To this end, adapters 280 may be configured to interpret feedback received from test tools 120 and to determine whether the corresponding transaction is a success or failure based on the feedback. If a transaction fails, an exception or other execution interrupt may be thrown, which may cause the corresponding test case to fail. If a transaction succeeds, the transaction may return a value, such as a "true" value for a "gotoURL" transaction or an attribute value for a "getValue (attribute)" transaction.

Results of executed transactions and test cases may be collected and logged. In certain examples, results of executed transactions may be written to one or more result files, which may be made accessible to a user by user interface facility 210. Results may include a reason for each failed transaction or test case, as well as an identification of a transaction that failed or caused a test case to fail. Logger 250 may be configured to record information descriptive of execution and/or results of transactions and test cases. Such information may include, but is not limited to, adapters 280 and/or test tools 120 used to execute transactions and/or test cases and/or reasons for failure of transactions and/or test cases.

Test integration subsystem 110 may be configured to coordinate execution of multiple test cases and transactions specified in the test cases. In particular, test integration subsystem 110 may be configured to coordinate execution of transactions and test cases based at least in part on availability of resources such as test tools 120 and assets 130 to be used in the execution of the transactions and test cases.

Figure 4:
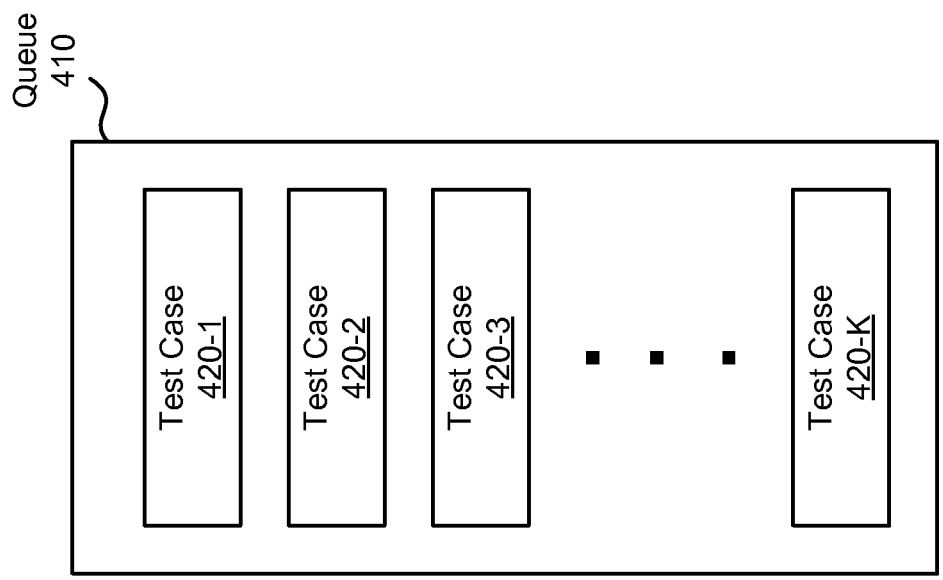
FIG. 4 illustrates an exemplary queue of test cases.

Test case manager 260 may be configured to manage test cases, including coordinating execution of the test cases. In certain examples, test case manager 260 may be configured to maintain a queue of one or more test cases that have been marked for execution. When a test case is marked for execution (e.g., a user submits a test run including the test case to test integration subsystem 110), test case manager 260 may add the test case to a queue for coordinated execution by test engine 240. FIG. 4 illustrates an exemplary queue 410 of test cases 420-1 through 420-K (collectively "test cases 420"). The test cases 420 may be ordered within queue 410 in accordance with any predetermined factor or factors, including the order in which the test cases 420 were marked for execution.

Test case manager 260 may be configured to coordinate execution of test cases 420 based at least in part on position in queue 410. Accordingly, execution of test cases 420 may be prioritized based on queue order.

Coordinated execution of test cases 420 may be further based on availability of resources to be used in the execution of the test cases 420. Accordingly, test case manager 260 is not limited to executing test cases sequentially based on queue order. In certain implementations, test case manager 260 may be configured to launch each test case in a separate thread, thereby allowing test cases to be executed in parallel and out of queue order. For instance, if resources are not available for a first test case, a subsequent test case for which resources are available may be executed before the first test case.

Resource manager 270 may be configured to manage use and availability of one or more resources. In certain examples, adapters 280 are configured to provide resource availability information to resource manager 270. Accordingly, resource manager 270 may be configured to communicate with and obtain information about resources from the adapters 280. Such information may be descriptive of attributes specific to each adapter 280, corresponding test tool 120, and/or asset 130 and may be represented in any suitable way (e.g., an array of hash objects). Examples of such configuration information may include values for class names, file names, resource paths or maps, addresses (e.g., IP addresses), number of supported instances or objects (e.g., number of supported web browser instances), phone numbers, channel identifiers, device type identifiers, and any other attributes descriptive of an adapter 280, corresponding test tool 120, and/or asset 130.

In certain examples, resource manager 270 is configured at startup based on information descriptive of a current configuration of adapters 280. This information may be stored in data storage facility 230 or may be provided directly by the adapters 280 at startup.

During operation of test integration subsystem 110, resource manager 270 may be configured to dynamically control and/or track availability of resources specified in the resource configuration. This may be accomplished in any suitable way. In certain embodiments, resource manager 270 may dynamically reserve and release resources for use in test cases. When a resource is reserved (i.e., checked out), the resource is marked as unavailable for use in other test cases. When the resource is released (i.e., checked in) after completion of a test case, the resource is marked as available for use in other test cases. As an example, when a web browser instance is reserved for use by a test case, resource manager 270 will indicate that the web browser instance is unavailable for use by another test case.

Test case manager 260 may be configured to communicate with resource manage 270 to determine availability of resources specified in a test case 420 included in queue 410. An exemplary test case workflow and execution will now be described with reference to the test case shown in Table 1.

When the test case in Table 1 is marked for execution, test case manager 260 may add the test case to queue 410. Resource types to be used in the execution of the test case may be identified from the test case. This may be performed in any suitable way. In certain implementations, the test case may be initialized as specified in the "initializeTestcase" definition included in the test case. The initialization definition may indicate one or more resource types that will be used during execution of the test case. In the test case shown in Table 1, resource objects included in an array and corresponding to account, web browser, and telephone type resources are indicated as resource types that will be used during execution of the test case. The resource objects are assigned to instance variables "@account," "@web browser," and "@telephone" for ease of use in the "runTestcase" definition included in the test case.

Test case manager 260 may use the identified resource types specified in the test case to coordinate execution of the test case. For example, test case manager 260 may be configured to communicate with resource manager 270 to ascertain the availability status of resources associated with the resource types. Resource manager 270 may inform test case manager 260 when a resource or resource type to be used during execution of a test case is available. Test case manager 260 may use queue 410 to prioritize test cases with respect to one another when determining whether resources are available. Accordingly, test case manager 260 may coordinate execution of a test case based at least in part on position of the test case in queue 410 and on availability of resources to be used during execution of the test case.

When test case manager 260 determines that resources to be used during execution of a test case are available, the resources may be reserved and the test case may be executed using the reserved resources. Resource manager 270 may mark the resources as "checked out" as instructed by the test case manager 260.

Reserved resources may be passed to the test case for use during execution of the test case. This may be performed in any suitable way, including passing one or more resource objects and/or resource maps to the test case. As described above, the test case in Table 1 includes a definition for getting resource maps for resource types for use during execution of the test case. The resource maps may be used during execution of the test case to determine specific adapters 280 to which transactions are provided.

Execution of the test case may include test engine 240 parsing the test case into one or more transactions, providing the transactions to appropriate adapters 280 based on resource maps or objects passed to the test case, translating the transactions to one or more test tool specific commands with the adapters 280, and providing the commands to appropriate test tools 120 for execution as described above. Feedback from execution of the transactions may be collected, logged, and made accessible to a user as described above. After execution of the test case is completed, the reserved resources may be released as described above.

Feedback from execution of a transaction associated with a test case may be passed to and used by another transaction. For example, an adapter 280-1 may receive data representative of a test result obtained by a test tool 120-1 from execution of a command. Adapter 280-1 may be configured to provide the test result to the test case for use in execution of another transaction. Hence, the test result may be provided to another test tool 120-2 for use in execution of another command. In this or similar manner, feedback obtained from test tools 120 may be integrated and used by a test case for further execution of the test case.

As mentioned, a test case may specify a resource type or a specific resource to be used during execution of the test case. This provides users with significant flexibility in writing test cases. A user may define a test case to use a specific resource (e.g., a specific test tool 120), or the user may define a test case to use a resource type, which may allow test integration subsystem 110 to select from one or more resources (e.g., multiple test tools 120) of the specified resource type. For example, test integration subsystem 110 may select from using a QTP or a Watir web browser test tool to perform web browser test operations when a test case specifies a web browser resource type. The selection may be based on availability of resources and/or on one or more other predetermined factors.

Figure 5:
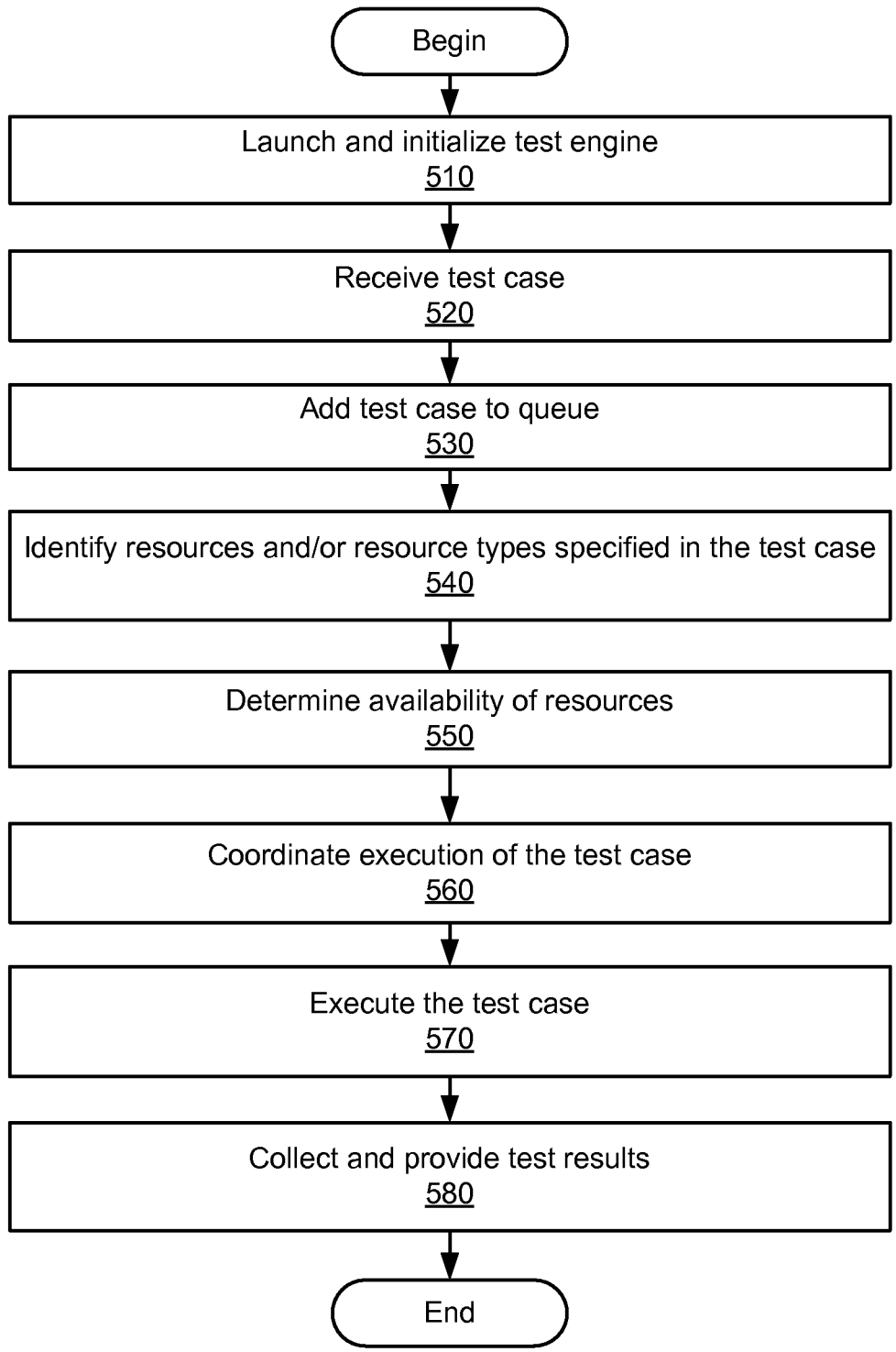
FIG. 5 illustrates an exemplary integrated testing method.

FIG. 5 illustrates an exemplary integrated testing method. While FIG. 5 illustrates exemplary steps according to one implementation, other implementations may omit, add to, reorder, and/or modify any of the steps shown in FIG. 5.

In step 510, test engine 240 is launched and initialized. Initialization may include any steps for preparing test engine 240 to prepare for execution of a test case as described above. For example, upon test engine 240 being launched, test engine 240 may coordinate loading of resource manager 270, launching of a test case manager 260 thread, and launching of a logger 250 thread. Initialization may also include establishing connectivity to data storage facility 230 and launching user interface facility 210.

In step 520, a test case is received. Step 520 may be performed in any of the ways described above, including user interface facility 210 receiving a test case definition file from a user by way of a user interface.

In step 530, the test case is added to a queue. Step 530 may be performed in response to the test case being marked for execution and in any of the ways described above, including test case manager 260 adding the test case to queue 410.

In step 540, one or more resources and/or resource types specified in the test case are identified. Step 540 may be performed in any of the ways described above, including obtaining this information from the test case.

In step 550, the availability of resources is determined. Step 550 may be performed in any of the ways described above, including resource manager 270 determining whether resources identified in step 540, or resources associated with resource types identified in step 540, are currently reserved for other test cases (i.e., unavailable) or not currently reserved for other test cases (i.e., available).

In step 560, execution of the test case is coordinated. Step 560 may be performed in any of the ways described above, including test case manager 260 coordinating execution of the test case based at least in part on the position of the test case in queue 410 and the availability of resources as indicated by resource manager 270.

In step 570, the test case is executed. Step 570 may be performed in any of the ways described above. An exemplary execution of a test case will be described further below in relation to FIG. 6.

In step 580, test results are collected and provided. Step 580 may be performed in any of the ways described above, including adapters 280 collecting feedback from test tools 120 and using the feedback to provide results for execution of transactions. In certain examples, the results of the execution of transactions and/or test cases are made accessible to a user through a user interface provided by user interface facility 210.

One or more of the steps shown in FIG. 5 may be repeated for continued processing of the same test case. For example, the test case may specify multiple resource types and/or resources to be used by the test case. Steps 540-560 may be repeated to identify another resource type specified in the test case, determine availability of another resource associated with the other resource type, and coordinate execution of the test case based on the queue and the availability of the other resource. Accordingly, an integrated test case including transactions to be performed by different resource types may be coordinated.

Figure 6:
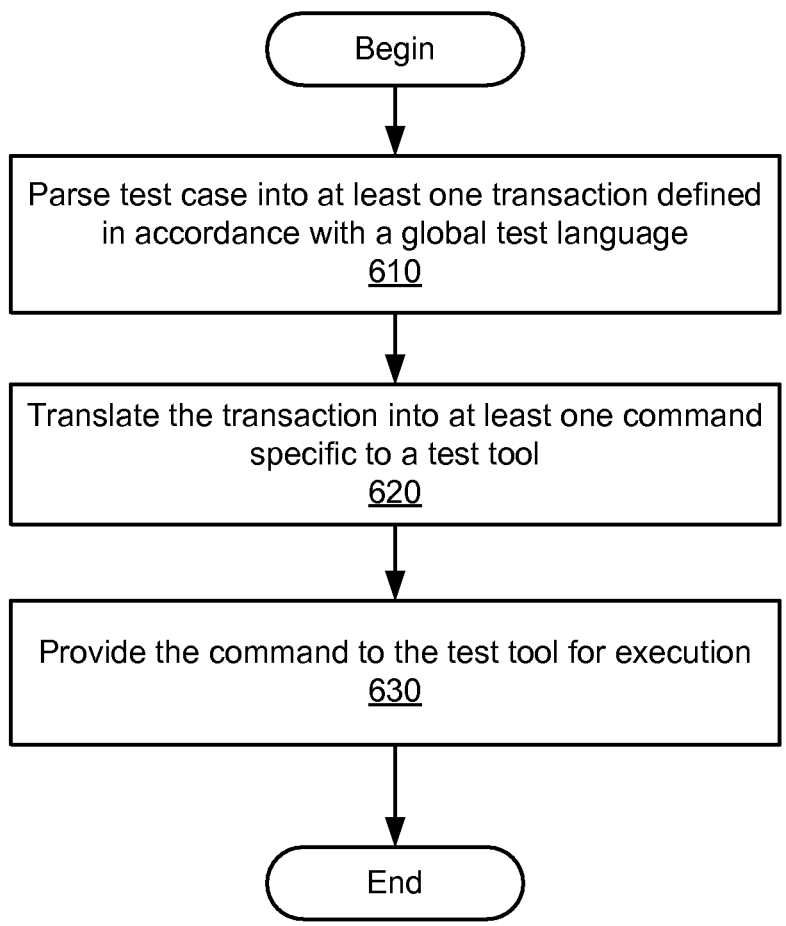
FIG. 6 illustrates an exemplary method of executing a test case.

FIG. 6 illustrates an exemplary test case execution method. While FIG. 6 illustrates exemplary steps according to one implementation, other implementations may omit, add to, reorder, and/or modify any of the steps shown in FIG. 6.

In step 610, a test case is parsed into at least one transaction defined in accordance with a global test language. Step 610 may be performed in any of the ways described above, including test engine 240 parsing the test case to identify one or more transactions defined in accordance with the global test language.

In step 620, the transaction is translated into at least one command specific to an automated test tool. Step 620 may be performed in any of the ways described above, including at least one adapter 280 translating the transaction into the test tool specific command as described above.

In step 630, the command is provided to the test tool for execution. Step 630 may be performed in any of the ways described above, including an adapter 280 transmitting data representative of the command to a test tool 120. The command may be provided in any suitable way and/or format configured to allow the test tool 120 to perform one or more test operations in accordance with the command.

One or more of the steps shown in FIG. 6 may be repeated for continued execution of the same test case. For example, the test case may be parsed into at least one other transaction defined in accordance with the global test language, the other transaction may be translated into at least one other command specific to another test tool, and the command may be provided to the other test tool for execution. In this or similar manner, a test case may be parsed into a plurality of transactions to be executed by different resources and/or resource types. Such transactions may be translated by different adapters 280 and provided to different test tools 120 for execution. Accordingly, an integrated test case including transactions to be performed by different resources and/or resource types may be executed.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
    parsing, by a test integration subsystem, data representative of an automated test case into at least one transaction defined in accordance with a global test language, wherein the automated test case comprises a set of computer readable instructions that when executed cause at least one test operation to be performed;
    translating, by said test integration subsystem, said at least one transaction defined in accordance with said global test language into at least one test operation command defined in accordance with a test language specific to an automated test tool, said at least one test operation command defining a test operation to be performed by said automated test tool on an asset; and
    providing, by said test integration subsystem, said at least one test operation command to said automated test tool for execution;
    wherein the automated test case is configured to test an application by initiating a placement of a phone call to a predetermined telephone number;

wherein the automated test case is further configured to test the application by initiating a verification that a list of calls in the application includes an entry for the phone call.

2. The method of claim 1, further comprising:
parsing, by said test integration subsystem, said data representative of said automated test case into at least one other transaction defined in accordance with said global test language;
translating, by said test integration subsystem, said at least one other transaction defined in accordance with said global test language into at least one other test operation command defined in accordance with a test language specific to another automated test tool, said at least one other test operation command defining a test operation to be performed by said another automated test tool on another asset; and
providing, by said test integration subsystem, said at least one other test operation command to said another automated test tool for execution.

3. The method of claim 1, further comprising:
adding, by said test integration subsystem, said automated test case to a queue;
determining, by said test integration subsystem, an availability of at least one resource; and
initiating, by said test integration subsystem, at least one of said parsing, said translating, and said providing based at least in part on said queue and said availability of said resource.

4. The method of claim 1, further comprising identifying, by said test integration subsystem, a resource type specified in said automated test case, wherein said resource type is associated with a predefined set of transactions defined in accordance with said global test language.

5. The method of claim 1, further comprising:
identifying, by said test integration subsystem, a resource type specified in said automated test case; and
selectively providing, by said test integration subsystem, said at least one transaction to an adapter for said translating of said at least one transaction, wherein said adapter is selected based at least in part on said resource type.

6. The method of claim 1, wherein said global test language defines a plurality of transaction sets and a plurality of resource types, and where each of said transaction sets is associated with a respective one of said resource types.

7. The method of claim 1, wherein the data representative of the automated test case comprises a script.

8. The method of claim 1, wherein the data representative of the automated test case comprises an automated test case definition file.

9. The method of claim 2, further comprising:
receiving, by said test integration subsystem, data representative of a test result from said automated test tool; and
providing, by said test integration subsystem, said test result to said another automated test tool for use in said execution of said at least one other test operation command.

10. The method of claim 4, wherein said resource type comprises one of a wireless phone resource type, a user interface resource type, a telephony resource type, a television resource type, and a data storage resource type.

11. A system comprising:
at least one physical computing device that:
parses data representative of an automated test case into at least one transaction defined in accordance with a global test language, wherein the automated test case comprises a set of computer readable instructions that when executed cause at least one test operation to be performed;
translates said at least one transaction defined in accordance with said global test language into at least one test operation command defined in accordance with a test language specific to an automated test tool, said at least one test operation command defining a test operation to be performed by said automated test tool on an asset; and
provides said at least one test operation command to said automated test tool for executions;
wherein the automated test case is configured to test an application by initiating a placement of a phone call to a predetermined telephone number;
wherein the automated test case is further configured to test the application by initiating a verification that a list of calls in the application includes an entry for the phone call.

12. The system of claim 11, wherein said at least one physical computing device:
parses said data representative of said automated test case into at least one other transaction defined in accordance with said global test language;
translates said at least one other transaction defined in accordance with said global test language into at least one other test operation command defined in accordance with a test language specific to another automated test tool, said at least one other test operation command defining a test operation to be performed by said another automated test tool on another asset; and
provides said at least one other test operation command to said another automated test tool for execution.

13. The system of claim 11, wherein said at least one physical computing device:
adds said automated test case to a queue;
determines an availability of at least one resource; and
initiates at least one of said parsing, said translating, and said providing based at least in part on said queue and said availability of said resource.

14. The system of claim 11, wherein the at least one physical computing device identifies a resource type specified in said automated test case, wherein said resource type is associated with a predefined set of transactions defined in accordance with said global test language.

15. The system of claim 11, wherein said at least one physical computing device:
identifies a resource type specified in said automated test case; and
selectively provides said at least one transaction to an adapter for said translating of said at least one transaction, wherein said adapter is selected based at least in part on said resource type.

16. The system of claim 11, wherein said global test language defines a plurality of transaction sets and a plurality of resource types, and where each of said transaction sets is associated with a respective one of said resource types.

17. The system of claim 11, wherein the data representative of the automated test case comprises a script.

18. The system of claim 11, wherein the data representative of the automated test case comprises an automated test case definition file.

19. The system of claim 12, wherein said at least one physical computing device:
receives data representative of a test result from said automated test tool; and provides said test result to said another automated test tool for use in said execution of said at least one other test operation command.

20. The system of claim 14, wherein said resource type comprises one of a wireless phone resource type, a user interface resource type, a telephony resource type, a television resource type, and a data storage resource type.

21. A non-transitory computer-readable medium storing instructions executable by one or more computing devices to:
    parse data representative of an automated test case into at least one transaction defined in accordance with a global test language, wherein the automated test case comprises a set of computer readable instructions that when executed cause at least one test operation to be performed;
    translate said at least one transaction defined in accordance with said global test language into at least one test operation command defined in accordance with a test language specific to an automated test tool, said at least one test operation command defining a test operation to be performed by said automated test tool on an asset; and
    provide said at least one test operation command to said automated test tool for executions;
    wherein the automated test case is configured to test an application by initiating a placement of a phone call to a predetermined telephone number;
    wherein the automated test case is further configured to test the application by initiating a verification that a list of calls in the application includes an entry for the phone call.

22. The non-transitory computer-readable medium of claim 21, the instructions executable by the one or more computing devices to:
    parse said data representative of said automated test case into at least one other transaction defined in accordance with said global test language;
    translate said at least one other transaction defined in accordance with said global test language into at least one other test operation command defined in accordance with a test language specific to another automated test tool, said at least one other test operation command defining a test operation to be performed by said another automated test tool on another asset; and
    provide said at least one other test operation command to said another automated test tool for execution.

23. The non-transitory computer-readable medium of claim 21, the instructions executable by the one or more computing devices to:
    add said automated test case to a queue;
    determine an availability of at least one resource; and
    initiate at least one of said parsing, said translating, and said providing based at least in part on said queue and said availability of said resource.

24. The non-transitory computer-readable medium of claim 21, the instructions executable by the one or more computing devices to identify a resource type specified in said automated test case, wherein said resource type is associated with a predefined set of transactions defined in accordance with said global test language.

25. The non-transitory computer-readable medium of claim 21, the instructions executable by the one or more computing devices to:
    identify a resource type specified in said automated test case; and
    selectively provide said at least one transaction to an adapter for said translating of said at least one transaction, wherein said adapter is selected based at least in part on said resource type.

26. The non-transitory computer-readable medium of claim 21, wherein said global test language defines a plurality of transaction sets and a plurality of resource types, and where each of said transaction sets is associated with a respective one of said resource types.

27. The non-transitory computer-readable medium of claim 21, wherein the data representative of the automated test case comprises a script.

28. The non-transitory computer-readable medium of claim 21, wherein the data representative of the automated test case comprises an automated test case definition file.

29. The non-transitory computer-readable medium of claim 22, the instructions executable by the one or more computing devices to:
    receive data representative of a test result from said automated test tool; and
    provide said test result to said another automated test tool for use in said execution of said at least one other test operation command.

30. The non-transitory computer-readable medium of claim 24, wherein said resource type comprises one of a wireless phone resource type, a user interface resource type, a telephony resource type, a television resource type, and a data storage resource type.

* * * * *